(12) United States Patent
Borsoi (10) Patent No.: US 7,360,282 B2
(45) Date of Patent: Apr. 22, 2008

(54) LACE BLOCKING DEVICE

(75) Inventor: Bruno Borsoi, Vittorio Veneto (TV) (IT)

(73) Assignee: Salomon S.A., Metz-Tessy (FR)

( * ) Notice: Subject to any disclaimer, the term of this patent is extended or adjusted under 35 U.S.C. 154(b) by 0 days.

(21) Appl. No.: 11/339,729

(22) Filed: Jan. 26, 2006

(65) Prior Publication Data

US 2006/0174460 A1  Aug. 10, 2006

(30) Foreign Application Priority Data

Feb. 4, 2005 (FR) .................................. 05 01120

(51) Int. Cl.
*A43C 7/08* (2006.01)
(52) U.S. Cl. .................. 24/136 R; 24/712.9
(58) Field of Classification Search .............. 24/136 R, 24/712.5, 712.9, 712.6, 712.1, 712.2, 122.6, 24/133; 36/50.1
See application file for complete search history.

(56) References Cited

U.S. PATENT DOCUMENTS

| 438,291 | A | * | 10/1890 | Quitman ....................... 188/64 |
| 913,469 | A | * | 2/1909 | Cleaveland ............ 24/134 KB |
| 1,243,106 | A | * | 10/1917 | Richardson ............ 24/134 KB |
| 1,481,903 | A | | 1/1924 | Hart |
| 1,660,040 | A | * | 2/1928 | Lehtonen ................ 24/134 KB |
| 2,193,383 | A | * | 3/1940 | Salzer .................... 24/134 KA |
| 2,200,895 | A | * | 5/1940 | Rio ........................... 24/712.5 |
| 3,845,575 | A | | 11/1974 | Boden |
| 4,278,042 | A | * | 7/1981 | Lindquist .................... 114/218 |
| 4,807,333 | A | | 2/1989 | Boden |
| 5,435,044 | A | * | 7/1995 | Ida .......................... 24/136 R |
| 5,477,593 | A | | 12/1995 | Leick |
| 5,537,763 | A | | 7/1996 | Donnadieu et al. |
| 5,566,474 | A | | 10/1996 | Leick et al. |
| 5,761,777 | A | | 6/1998 | Leick |
| 6,339,867 | B1 | * | 1/2002 | Azam ....................... 24/712.5 |
| 2005/0005477 | A1 | | 1/2005 | Borsoi |

FOREIGN PATENT DOCUMENTS

| DE | 89 05 469 U1 | 9/1989 |
| DE | 203 18 638 U1 | 6/2004 |
| FR | 2 706 743 A1 | 12/1994 |
| FR | 2 792 509 A1 | 10/2000 |

\* cited by examiner

*Primary Examiner*—Robert J. Sandy
(74) *Attorney, Agent, or Firm*—Greenblum & Bernstein, P.L.C.

(57) ABSTRACT

A device for blocking at least one strand of a lace or cord, including a hollow body, a blocking member, and a control member. A cavity of the hollow body defines a housing of the blocking member. The control member allows biasing the blocking member for a displacement in a direction for blocking or unblocking the strand. A reversible locking mechanism in a stable manner retains the control member in a position for unblocking the strand.

29 Claims, 4 Drawing Sheets

LACE BLOCKING DEVICE

CROSS-REFERENCE TO RELATED APPLICATIONS

This application claims priority under 35 U.S.C. §119 of French Patent Application No. 05.01120, filed on Feb. 4, 2005, the disclosure of which is hereby incorporated by reference thereto in its entirety.

BACKGROUND OF THE INVENTION

1. Field of the Invention

The invention relates to a mechanical device for blocking flexible strands, such as laces, cords, cables, ropes, strings, or any other such product or filiform element.

More specifically, the invention relates to the blocking of laces of articles of footwear as such articles of footwear are tightened by means of the laces. Thus, the invention also relates to an article of footwear equipped with a blocking device, and to a lace tightening mechanism provided with a blocking device.

More specifically, the invention relates to the field of sports and especially to footwear for snowsurfing or snowboarding, skiing, cross country skiing, roller or ice skating, cycling, hiking, walking, or the like, as well as to tightening mechanisms for bindings and products such as backpacks, including such strands in association with the tightening and/or the compression of these products or of parts thereof.

2. Description of Background and Relevant Information

It is known to block flexible strands, such as the laces of articles of footwear, by means of a blocking device.

For instance, French Patent Publication No. 2 706 743 and U.S. Pat. No. 5,477,593 disclose a blocking device that acts at least on one strand, such as at least one strand of a lace. According to these documents, the device includes a pushing device that defines the rotational axis of a blocking member, as well as a hollow body, one cavity of which defines at least one pathway for the passage of each strand, on the one hand, and a housing for the blocking member, on the other hand. The latter has a circular shape and is free in rotation about the axle that is itself movable in translation.

The device according to FR 2 708 743 and U.S. Pat. No. 5,477,593 functions by cooperation of the blocking member with each pathway for the blocking of each strand through a wedging effect. The blocking member is elastically biased in the direction for blocking the strand(s) by acting on its rotational axis. The elastic bias prevents an ill-timed unblocking.

In this manner, although it is elastically biased, the blocking member remains free in rotation and allows balancing the tensions on the two strands, even when there is a difference between the forces exerted on the strands. The blocking is therefore still achieved.

The reverse operation, that of unblocking, is obtained by manual action on the pusher against the elastic bias. The unblocking remains effective as long as the manual action is sustained. If the manual action is stopped, the elastic bias then puts the device back into a blocking condition. Consequently, it is necessary to sustain the manual action during the entire time the strand passes through during the unblocking. This can be tedious inasmuch as, in general, one has to act on the device with one hand, and simultaneously act on the strand with the other hand, especially if the length of the strand to be freed is substantial, for example when one wishes to entirely open a shoe to remove it.

In order to simplify the unblocking operation, especially to avoid having to sustain a manual unblocking action, a device that is not provided with an elastic mechanism can be used.

For instance, U.S. Pat. No. 4,807,333 provides for a blocking device that acts on at least one strand. The device includes a rotational axis for a blocking member and a hollow body, one cavity of which defines at least one pathway for the passage of each strand, on the one hand, and a housing for the blocking member, on the other hand. The blocking member has a circular shape and is free in rotation about an axis that is itself movable in a plans substantially parallel to the blocking member. The device functions by cooperation of the blocking member with each pathway for the blocking of each strand through a wedging effect. A control member allows biasing the rotational axis of the blocking member for movement towards a direction for blocking or unblocking the strand(s).

Thus, according to U.S. Pat. No. 4,807,333, it is sufficient to momentarily act on the control member to place the device in an unblocking condition. It is not necessary to act simultaneously on the device with one hand and on the strand with the other hand.

However, it has been recognized, when the device is being used according to U.S. Pat. No. 4,807,333, that the blocking member sometimes recovers a blocking position without being biased by an action on the control member. The manipulations of the device sometimes result in an undesired blocking. For example, the blocking member can be biased into a blocking direction by gravity, or friction of the strand(s) on the blocking member can sometimes drive it in a blocking position. In other words, the blocking member does not stably remain in a blocking position. Conversely, the blocking member does not remain in the blocking position due to the lack of elastic bias.

SUMMARY OF THE INVENTION

An object of the invention is to provide for an improved blocking device. More particularly in the case of a blocking device not provided with an elastic mechanism, such as the two elastic tongues 25 disclosed in FR 2 706 743 and U.S. Pat. No. 5,477,593, an object of the invention is to stabilize the unblocking position of a blocking member.

To this end, the invention proposes a blocking device, acting on at least one strand, in particular including a blocking member, as well as a hollow body, one cavity of which defines at least one pathway for the passage of each strand, on the one hand, and a housing for the blocking member, on the other hand, the device functioning by cooperation of the blocking member with each pathway for the blocking of each strand through a wedging effect, a control member being associated with the blocking member and allowing biasing the blocking member for a displacement in the direction for blocking or unblocking the strand(s).

A reversible locking mechanism stably retains the control member in a unblocking position of the strand(s).

The reversible locking mechanism prevents any undesired movement of the control member and, consequently, any undesired movement of the blocking member. As a result, after being placed in the unblocking position, the device remains in the unblocking position. The loosening operation, which involves maintaining the blocking device in the unblocking position, is thus facilitated, since it no longer necessitates a manual action on the device to sustain the unblocking. As a consequence, any subsequent blocking will be the result of a desired operation. Among the resulting advantages are a savings of time and an easier manipulation of the device.

The blocking member is movable along a longitudinal direction of the blocking device, between a first blocking position of each strand and a second unblocking position of each strand, and the control member is guided between each of these positions by an inclined cavity with respect to the longitudinal direction.

Thus, any displacement of the control member in the area of the cavity causes a displacement of the blocking member in a longitudinal direction, either for blocking, or for unblocking. A slight displacement in a longitudinal direction suffices to switch from a blocking position to an unblocking position.

The cavity of the blocking device according to the invention includes a first end adapted to cooperate by ratchet engagement with an associated element of the control member in the unblocking position.

This structure enables a simple and easy implementation of the device.

The control member of the blocking device is driven by at least one strand in the blocking or unblocking directions.

In this case, it suffices to move the strand away to either block or unblock.

According to an embodiment that will be described in detail hereinafter, the blocking member has a circular shape, includes a rotational pin or axle for the blocking member, the blocking member being free in rotation about the axis that is itself movable in a plane substantially parallel to the blocking member, the control member allowing biasing the rotational pin/axle of the blocking member for a displacement in the direction for blocking or unblocking the stand(s). Furthermore, the blocking member is provided with teeth.

Such a structure allows balancing tensions in the strands, by way of the rotation of the blocking member.

BRIEF DESCRIPTION OF DRAWINGS

Other characteristics and advantages of the invention will be better understood upon reading the following description, with reference to the attached drawings showing, by way of a non-limiting embodiment, how the invention can be embodied, and in which.

DETAILED DESCRIPTION OF THE INVENTION

Although the embodiment described hereinafter relates more particularly to the field of snowboarding, such as snowboard boots, for example, it is to be understood that it also applies to other fields, as mentioned above.

The described embodiment is illustrated in FIGS. 1-8.

Figure 1:
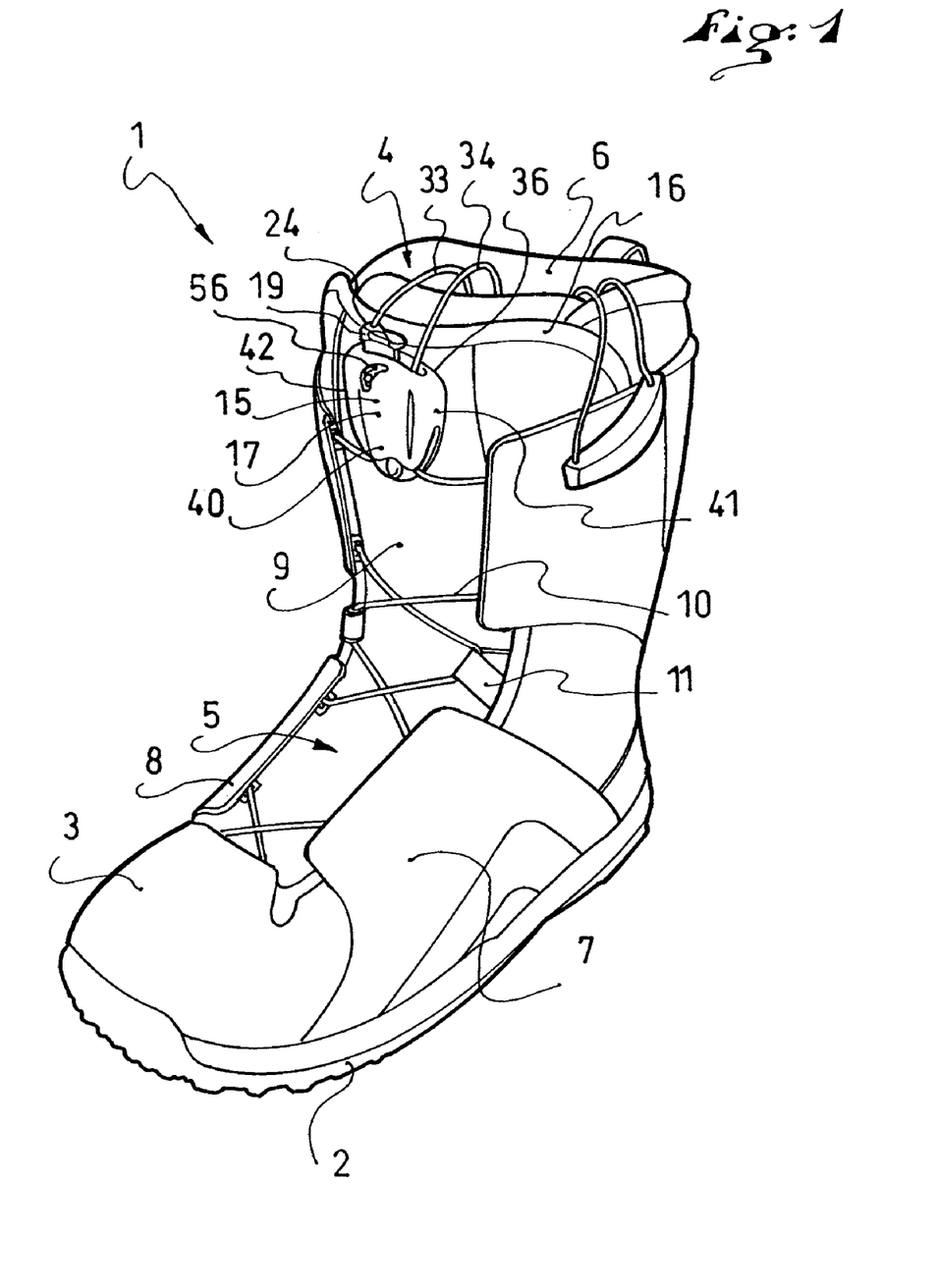
FIG. 1 is an overall view of a boot having strands and a blocking device according to an illustrated embodiment of the invention.

As shown in FIG. 1, a snowboard boot 1 includes an external sole 2 overlaid by an upper 3. An opening 4 of the upper 3 includes a slit 5 connected to an upper opening 6 at the top of the boot. The slit 5 separates a lateral quarter 7 from a medial quarter 8 of the upper 3, which facilitates the wearer to put on and to remove his/her boot by spacing apart or to bring closer together, respectively, the quarters 7, 8. The opening 6 is a subdivision of the opening 4 that serves as a passage for a user's lower leg. In addition, a tongue 9 is provided to dose the slit 5.

To tighten or loosen the upper 3, a reversible tightening mechanism is provided. The tightening mechanism includes a cord or lace 10 that facilitates the lateral and medial quarters 7, 8 being brought closer together or, to the contrary, being spaced further apart. The lace 10 follows a path in the area of the slit 5, between the quarters 7, 8. Keepers or guides 11 arranged on both sides of the slit 5, on the edges of the quarters 7, 8, are provided to guide the lace 10. Although the term "lace" and "cord" are used herein for convenience, neither these terms nor the particular size or shape thereof shown in the drawings are to be considered limiting, the invention encompassing other filiform elements of various sizes and shapes, including various cross-sectional shapes, such as flat, circular, elliptical, square, and rectangular, and made of any of various materials.

The mechanism for tightening the upper 3 also includes a device 15 for blocking the lace 10. For example, the device 15 is affixed to the tongue 9 by any suitable means such as screws, rivets, glue, stitches, or the like. The device 15 can also be freely mounted on the upper.

More specifically, the blocking device 15 is located toward a free end 16 of the tongue 9, shown in FIG. 1 as an uppermost free end. As will be subsequently better understood, this enables an easier manipulation of the mechanism for tightening the upper 3. However, it could also be provided that the blocking device 15 be located elsewhere on the tongue 9, or even not affixed to the tongue 9.

Figure 2:
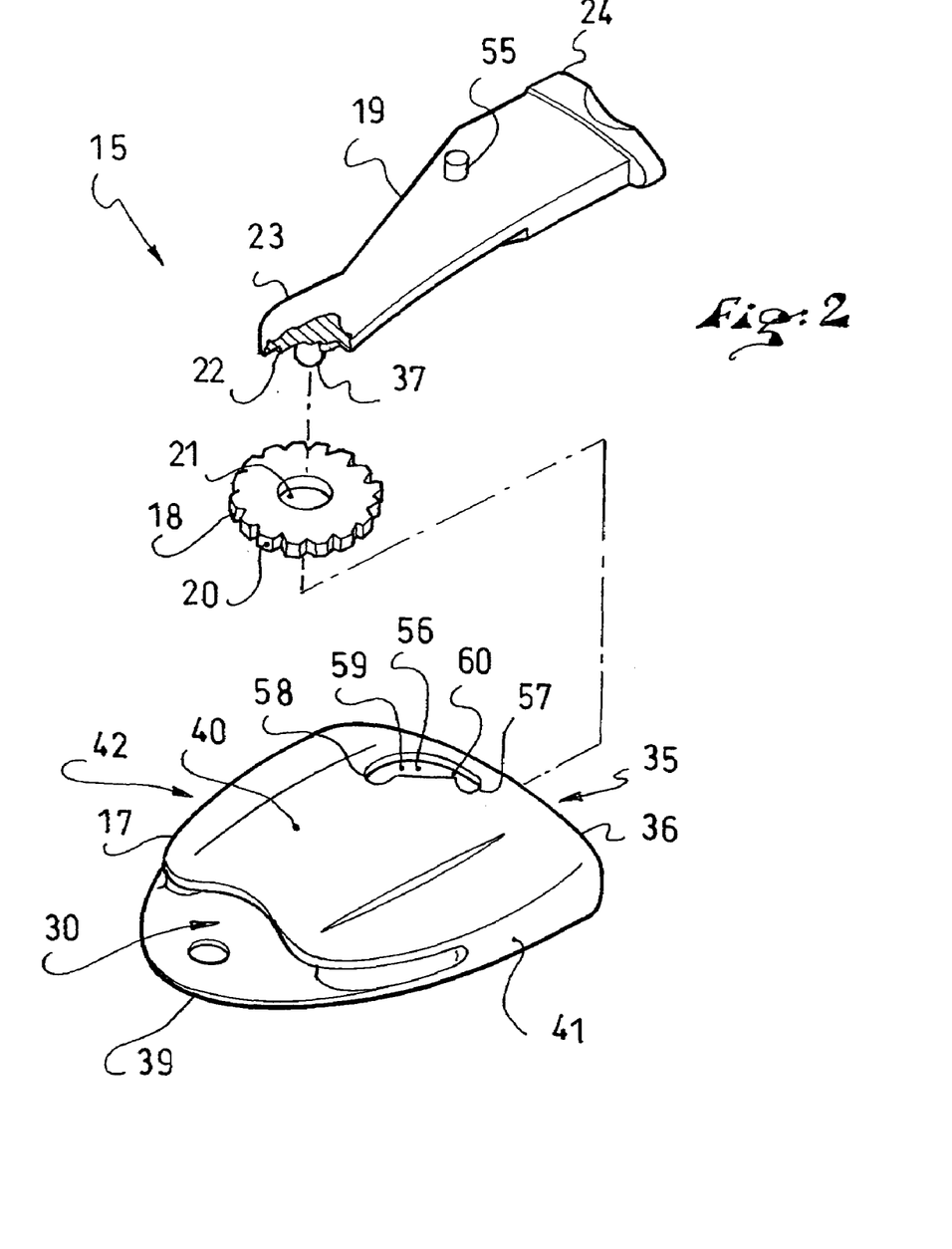
FIG. 2 is an exploded perspective view of the blocking device of FIG. 1.

As more particularly shown in FIG. 2, the blocking device 15 includes three elements, namely, a hollow body 17, a circular blocking member 18, and a control member 19 housed in part inside the body 17 and connected to the blocking member 18 to allow for its manipulation. As seen in other figures of the illustrated embodiment, a wall of the hollow body 17 covers completely the blocking member 18.

The blocking member 18 includes, for example, a wheel provided with teeth 20 on its periphery. Through the center of the wheel 18 a hole 21 is provided for receiving a pin or axle 22 that originates from the control member 19. The wheel 18 and the control member 19 are associated by nesting the wheel 18 on the pin 22. The hole 21 and the pin 22 are respectively provided with a circular shape, which enables the rotation of the wheel 18 about the pin/axle. However, it could also be provided for the wheel to be non-rotatably mounted, or for the wheel to be replaced by a fixed element having a different shape. In the latter case, a wedge is suitable.

According to the illustrated embodiment, the pin/axle 22 that guides the wheel 18 is located in the area of an inner end 23 of the control member 19. The control member 19 has another end 24, a so-called outer end, which, as described hereinafter and shown in various drawing figures, projects with respect to the hollow body 17.

Figure 4:
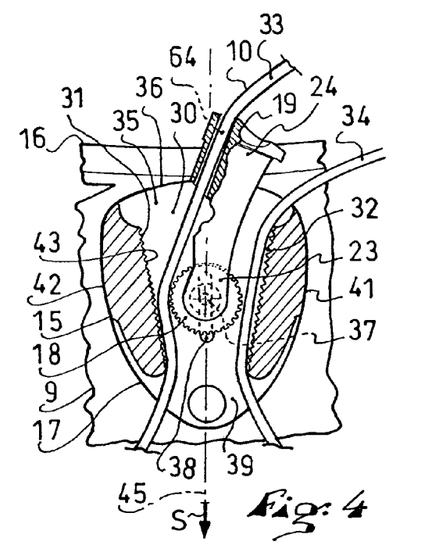
FIG. 4 is a cross-sectional view of the device in the unblocking position, along the lines of contact of the strands and pathways.

As shown in FIG. 4, for example, the hollow body 17 internally includes a cavity 30 adapted to house the toothed wheel 18 and defines, as will be shown hereafter, a first pathway 31 and a second 32 pathway for the passage and wedging of a first strand 33 and a second strand 34 of the lace 10.

In order to mount the blocking device 15, the wheel 18 is first positioned on the pin/axle 22 of the control member 19. The control member is then inserted in the cavity 30 of the hollow body 17. To this end, an opening 35 is provided at an axial end 36 of the hollow body. Also, a retaining mechanism for retaining the wheel 18 and the control member 19 in the cavity 30 is provided. This retaining mechanism includes, for example, a finger 37 that extends from the control member 19 to cooperate with a cavity 38 provided in a connection wall 39 of the hollow body. The finger 37 extends the pin/axle 22 of the control member 19. The cavity 38, as shown in FIGS. 4 to 8, is made in the form of a guiding groove that may, or may not, extend through the connection wall 39 of the hollow body 17. The groove 38 is oriented along the longitudinal direction of the hollow body 17 or generally in such longitudinal direction. The groove 38 has a width equal to or slightly greater than the diameter of the finger 37, as well as with a length that is sufficient to allow for a longitudinal displacement of the blocking member 18 between an unblocking position and a blocking position. This arrangement renders the pin/axle 22 movable in a plane parallel to the wheel 18.

Figure 8:
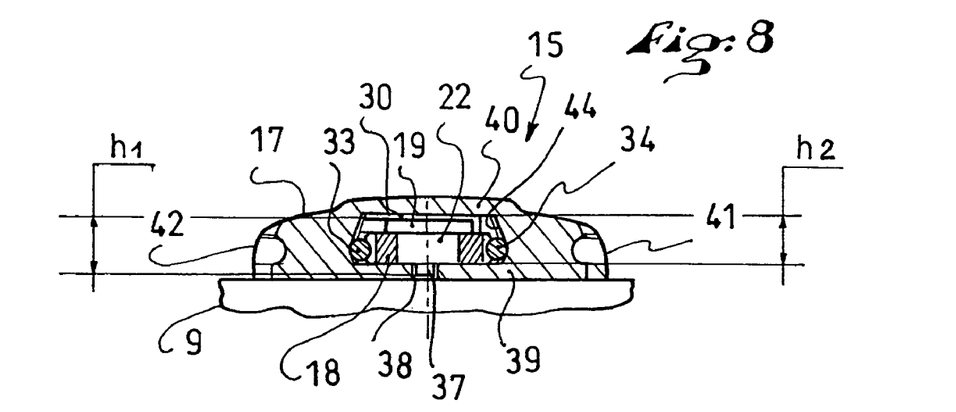
FIG. 8 is a cross-section along the line VIII-VIII of FIG. 7.

In FIG. 8 the combined width h1 of the control member 19, pin/axle 22, and finger 37 is greater than the distance h2 that separates the connection wall 39 from a wall 40 for covering the hollow body 17. Thus, the control member 19 is forcibly inserted in the cavity 30, by varying the elasticity of the hollow body 17. The latter reversibly and elastically deforms to allow for the passage of the control member 19. A ratchet effect is obtained due to the finger 37, which prevents the control member 19 from being dismounted. Thus, mounting the device by ratchet engagement is simple in the sense that no additional element, such as a screw, is necessary.

FIGS. 4 to 8 more particularly show the embodiment of the pathways 31, 32 and the cooperation of the blocking member or the wheel 18 with them.

The pathways 31, 32 are located in the cavity 30, along each of the two side surfaces 41, 42 of the body 17, and include serrations 43.

In order to receive the strands 33, 34, the pathways 31, 32 have a groove-shaped section that can be rounded or formed of straight segments 44, as shown in FIG. 8.

Figure 5:
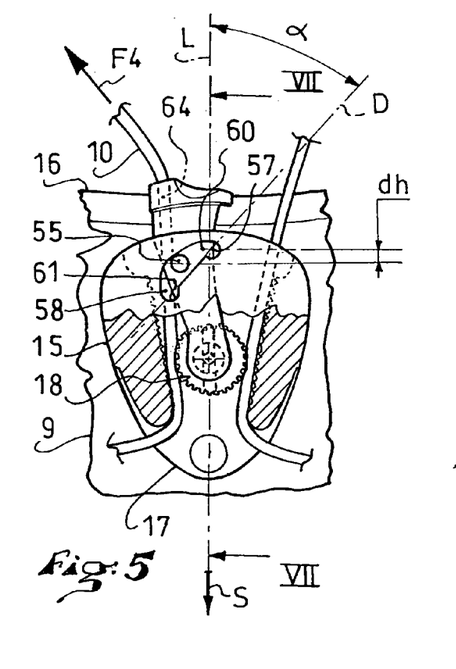
FIG. 5 is a view similar to FIG. 4, in an intermediate position between the unblocking and the blocking of the strands.
Figure 6:
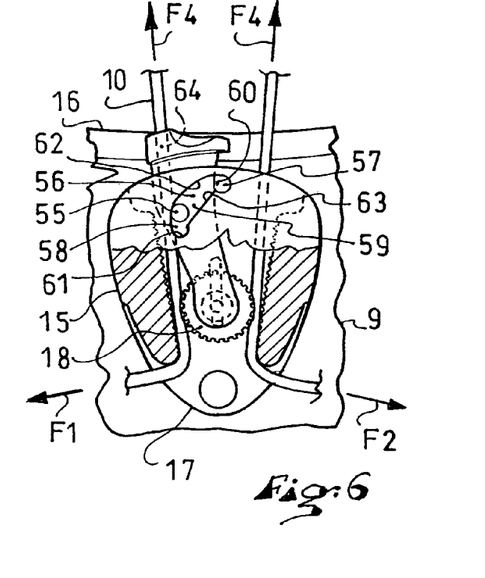
FIG. 6 is a view similar to FIG. 4, in a position in which the strands are blocked.
Figure 7:
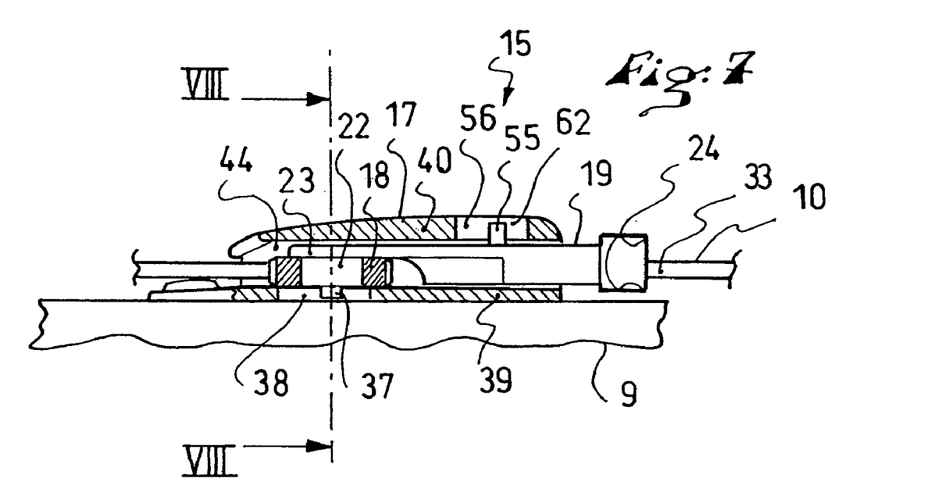
FIG. 7 is a cross-section along the line VII-VII of FIG. 5.

As shown in FIGS. 4 to 6, the pathways 31, 32 are substantially rectilinear and their non-parallel directions converge so as to intersect on the axis of symmetry 45 of the blocking device 15, along the direction S.

There are two end positions of the control member 19 that correspond, one to the blocking of the lace 10, the other to the unblocking of the lace 10.

The blocking position is especially shown in FIGS. 1 and 6.

As shown in FIG. 6, in the blocking position, the wheel 18 tightens the strands 33, 34 by pressing thereon at the bottom of the pathways 31, 32 of the body 17.

The blocking of the strands 33, 34 is thus obtained through a wedging effect due to the cooperation of the pathways 31, 32 and wheel 18. The wedging phenomenon is intensified by the elasticity of the boot 1 that appears following the tightening of the lace 10. The elasticity of the boot 1 exerts on the lace 10 a tension that is reflected in the area of the wheel 18 by the strands 33, 34.

The advantage provided by the blocking by wedge effect is that the magnitude of the tightening force on the strands 33, 34 applied by the wheel 18 is in proportion to the traction forces exerted on the strands, and results solely from these forces.

Another advantage, due to the fact that the wheel 18 is rotationally free about the pin/axle 22, is that a difference in the traction forces F1, F2 on both strands 33, 34 does not cause a wedging of the system or a relative sliding of one of the strands with respect to the blocking member 18.

A blocking effect can also be obtained with a wheel or another blocking member that cannot rotate.

Figure 3:
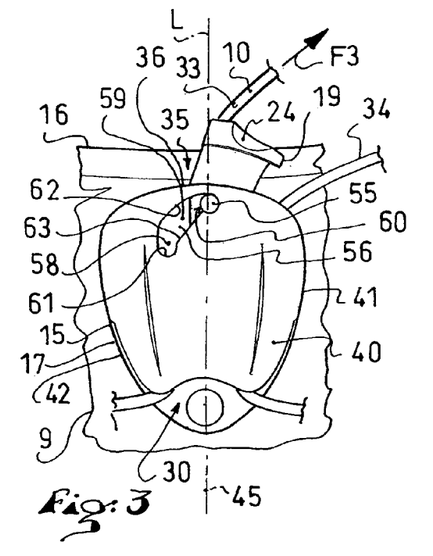
FIG. 3 is a top outer view of the blocking device in the position for unblocking the strands.

FIGS. 3 and 4 illustrate the extreme unblocking position.

To maintain the control member 19 in this position according to the invention, a reversible locking mechanism stably retains the control member 19 in the position for unblocking the strand(s) 33, 34 of the lace 10.

The reversible locking mechanism calls for the principle of nesting a male element with a female element.

According to the embodiment described and shown in the perspective view of FIG. 2, e.g. the male element includes a locking finger 55 that extends from the control member 19. The finger 55 is an element associated with the control member 19 and is located between the inner 23 and outer 24 ends of the control member 19. The finger 55 of the reversible locking mechanism is parallel, or substantially parallel, to the finger 37 of the retaining mechanism.

The female element is formed by a cavity 56 provided in the wall 40 covering the hollow body 17 for receiving the locking finger 55. The cavity 56 is shaped in the form of a slot as it extends through the wall 40; but one could also provide for the cavity 56 not to extend therethrough. One could also provide for the cavity 56 to be arranged in the connection wall 39.

As can be understood with reference to FIGS. 1 to 8, the cavity 56 is provided with a first end 57 and a second end 58 connected by a slot 59.

The first end 57 is provided to receive the locking finger 55. In this regard, the first and 57 and the locking finger 55 each have a shape that allows them to be nested together. The first end 57 is a portion of a circle that is connected to the slot 59 by means of a narrowing 60. The finger 55 is a cylinder, the diameter of which is equal to or slightly smaller than that of the first end 57. Shapes other than circular or cylindrical could be provided. The narrowing 60 has a width that is slightly smaller than the diameter of the first end 57, and slightly smaller than the diameter of the finger 55. Thus, the passage of the finger 55 from the slot 59 to the first end 57, or vice versa, is carried out against a hard area formed by the narrowing 60 according to a ratchet affect. After its passage in the first end 57, the locking finger 55 is retained in a stable position from which it cannot exit, except in the case of a specific action thereon. The stability is due to the structure of the locking mechanism, especially of the cavity 56.

The second end 58 of the cavity 56 is also provided to receive the locking finger 55. This end 58 has a shape that enables the locking finger 55 to move freely. The second end 58 is a recess that is at least as wide as the diameter of the locking finger 55, the recess having a rounded bottom 61. The finger 55 ends up in the recess 58 when the device 15 is in a blocking condition, in this case, the position of the locking finger 55 is also stable, but this is due to the wedging of the wheel 18 between the pathways 31, 32 of the hallow body 17.

The slot 59 guides the locking finger 55 from one of the ends 57, 58 of the cavity 56 to the other. The guiding is carried out in an oblique direction with respect to the longitudinal direction L of the device 15 or hollow body 17, i.e., along the length of the device or hollow body. This is due to the locations of the ends 57, 58. The first end 57 is located in the vicinity of the axial end 36 and substantially mid-way between the side surfaces 41, 42 of the hollow body 17. The second end 58 is at the same time farther from the axial end 36, and closer to a side surface 42. Thus, a straight line D that extends through the ends 57, 58 of the cavity 56 forms an angle α with the longitudinal direction L of the hollow body 17. Stated another way, as shown in the drawings, the blocking member 18 is guided for displacement in a straight line in the longitudinal direction L, via the slot 38, whereas, via the locking finger 55, the control member 19 is guided for movement between the strand-blocking and strand-unblocking positions in an oblique direction, i.e., along a path, at least a segment of such path being neither along the straight line nor parallel to the straight line.

More specifically, the slot 59 has a first concave wall 62 on the side of the axial end 36 of the hollow body 17, as well as a second substantially straight wall 63 fading the concave wall 62. The second wall 63 is farther from the axial end 36 of the hollow body 17. The two walls 62, 63 provide the slot 59 with a varying width. However, one could also provide for the slot to have a constant width. In such a case, each wall 62, 63 can be straight or curved. A variable width of the slot can also be made with two curved walls.

In order to unblock the lace 10 and to loosen the boot 1, the blocking device 15 is set in the unblocking position, as shown in FIGS. 3 and 4.

For this, it suffices to bias the control member 19 until the locking finger 55 is positioned in the first end 57 of the cavity 56. During the switch from. Its position according to FIG. 6 or FIG. 5 to its position according to FIG. 3, the finger 55 is displaced along a longitudinal direction L by a value dh that is sufficient to unblock the blocking member 18. The bias can be direct, by means of a transverse manual action on the outer end 24 of the control member 19. The bias could also be indirect, by means of transverse or oblique traction along the arrow F3 on the lace 10.

In this case, the bias is transmitted by the lace 10 to the control member 19. Indeed, the control member 19 is provided with a passage 64 adapted to allow a strand 33 of the lace 10 to extend therethrough. As shown in the drawing, the passage is a through-opening within the control member 19, i.e., a surface of the passage completely surrounds a transverse cross section of the strand 33. The strand 33 can slide freely in the passage 64, especially since the passage 64 is substantially parallel to the pathways 31, 32.

In each case, the bias is oriented away from the side surface 42 of the hollow body 17, in the vicinity of which surface the second end 58 of the cavity 56 is located. Thus, the locking finger 55 takes support on the second wall 63 of the slot 59 in order to move towards the first end 57 of the cavity 56. By doing so, the finger 55 drives the wheel 18 in an unblocking position, as it moves it by a value dh in a longitudinal direction.

Conversely, to block the lace 10, the blocking device 15 is set in a blocking position as shown more particularly in FIGS. 5 and 6.

For this, it suffices to bias the control member 19 until the locking finger 55 is positioned in place in the slot 59, or in the second end 58 of the cavity 56. The displacement of the finger 55 positions it in the blocking position by way of sliding along the cavity or slot 56. Here as well, the bias can be direct, by means of transverse manual action on the outer end 24 of the control member 19; or the bias can be indirect, by means of axial or oblique traction along an arrow F4 on the lace 10. When it is direct, the bias brings the locking finger 55 to be supported on the first wall 62 of the slot 59. Because of its curvature, the wall 62 pushes the finger 55, and therefore the wheel 18, along a path having not only a lateral component but also a longitudinal component, due to the inclination of the cavity or slot 56, towards a blocking position.

When it is indirect, the bias also brings the locking finger 55 to take support on the first wall 62 of the slot 59. Indeed, the strand 33 of the lace 10 at least partially transmits the bias to the control member 19.

The foregoing description and drawings evidence the extent to which the tightening of the boot is simple. The only traction of the lace 10 simultaneously carries out two functions, namely tensioning the lace 10 on the one hand, and placing the wheel 18 in a position for wedging the strands 33, 34, on the other hand. Indeed, the traction biases the control member 19 towards the blocking position. The tightening can be done with one hand since the blocking device 15 is affixed to the tongue. Furthermore, the tightening is done with a natural movement that involves pulling the lace 10 towards oneself.

From a general standpoint, the invention is made from materials and implementation techniques known to the one having ordinary skill in the art.

In a particular embodiment, each component is made of a plastic material.

The invention is not limited to the particular embodiment hereinabove described and as illustrated, and includes all of the technical equivalents within the scope of the claims that follow.

In particular, it is not necessary for a strand to extend through the control member 19.

Furthermore, a structure other than the finger 55 and the cavity 56 can be had to provide the reversible locking mechanism.

The invention claimed is:

1. A blocking device adapted to act on at least one strand, said blocking device comprising:
    a blocking member;
    a hollow body having at least one cavity defining at least one pathway for the passage of each strand of said at least one strand;
    a housing for the blocking member; the device functioning by cooperation of the blocking member with each of the at least one pathway for the blocking of each strand through a wedging effect, a control member being associated with the blocking member and allowing the blocking member to be biased for a displacement in a direction for unblocking the at least one strand;
    a reversible locking mechanism stably retaining the control member in a position for unblocking the at least one strand; and
    the blocking member being free of an elastic mechanism for biasing the blocking member in a blocking position.

2. A blocking device according to claim 1, wherein:
    the blocking member has a circular shape.

3. A blocking device according to claim 2, further comprising:
a rotational pin/axle for the blocking member, the blocking member being free in rotation about the pin/axle and movable in a plane substantially parallel to the blocking member, the control member allowing biasing the rotational pin/axle of the blocking member for a displacement in a direction for blocking or unblocking the at least one strand.

4. A blocking device according to claim 2, wherein:
the blocking member comprises a periphery, teeth extending outwardly from said periphery.

5. A blocking device according to claim 1, wherein:
a retaining mechanism retains the blocking member and the control member in the cavity of the hollow body.

6. A blocking device according to claim 5, wherein:
the retaining mechanism includes a finger that originates from the control member, the finger being provided to cooperate with a cavity arranged in a wall of the hollow body.

7. A blocking device according to claim 1, wherein:
the control member has a passage provided such that a strand of the lace extends therethrough.

8. A blocking device according to claim 1, wherein an outer surface of the blocking member is free of engagement with an elastic biasing mechanism in an unblocking position.

9. A blocking device according to claim 1, wherein the blocking member is free of an elastic mechanism for biasing the blocking member in an unblocking position.

10. A blocking device according to claim 1, wherein:
the blocking member is guided for movement along a straight line along a length of the hollow body between a strand-blocking position and a strand-unblocking position; and
the control member is guided for movement between the strand-blocking and strand-unblocking positions along a path, at least a segment of said path being neither along said straight line nor parallel to said straight line.

11. A blocking device according to claim 1, wherein:
the housing includes a wall covering completely the blocking member.

12. A blocking device according to claim 1, wherein:
a passage is provided in the control member in the form of a through-opening such that a strand of the lace extends therethrough.

13. A blocking device adapted to act on at least one strand, said blocking device comprising:
a blocking member;
a hollow body having at least one cavity defining at least one pathway for the passage of each strand of said at least one strand;
a housing for the blocking member;
the device functioning by cooperation of the blocking member with each of the at least one pathway for the blocking of each strand through a wedging effect, a control member being associated with the blocking member and allowing the blocking member to be biased for a displacement in a direction for blocking or unblocking the at least one strand;
a reversible locking mechanism stably retaining the control member in a position for unblocking the at least one strand;
the blocking member being movable along a longitudinal direction of the blocking device between a first position for blocking each strand and a second position for unblocking each strand;
the control member being guided between each of the first and second positions by a cavity in a wall of the hollow body, said wall cavity extending obliquely with respect to the longitudinal direction.

14. A blocking device according to claim 13, wherein:
the obliquely extending cavity comprises a first end adapted to cooperate by ratchet engagement with an associated element of the control member in the unblocking position.

15. A blocking device according to claim 13, wherein:
the control member is driven by at least one strand in the blocking or unblocking direction.

16. A blocking device according to claim 13, wherein:
the control member has a surface extending outside of said hollow body, said surface being engageable with said strand to enable a force applied by said strand to said surface to drive the control member in the blocking or unblocking direction.

17. A blocking device according to claim 13, wherein the blocking member is free of an elastic mechanism for biasing the blocking member in an unblocking position.

18. A blocking device adapted to act on at least one strand, said blocking device comprising:
a blocking member;
a hollow body having at least one cavity defining at least one pathway for the passage of each strand of said at least one strand;
a housing for the blocking member;
the device functioning by cooperation of the blocking member with each of the at least one pathway for the blocking of each strand through a wedging effect, a control member being associated with the blocking member and allowing the blocking member to be biased for a displacement in a direction for blocking or unblocking the at least one strand;
a reversible locking mechanism stably retaining the control member in a position for blocking the at least one strand;
the reversible locking mechanism includes a locking finger extending from the control member and has a cavity provided in a wall of the hollow body to receive the locking finger, the wall cavity having a first end and a second end connected by a slot, the first end being connected to the slot by means of a narrowing, the passage of the finger from the slot to the first end, or vice versa, being carried out against a hard area formed by the narrowing.

19. A blocking device according to claim 18, wherein:
the first end of the wall cavity is located in the vicinity of an axial end and substantially mid-way between the lateral surfaces of the hollow body;
the second end of the wall cavity is at the same time farther from the axial end and closer to a side surface of the hollow body.

20. A blocking device according to claim 18, wherein:
the cavity that receives the locking finger is arranged in a wall for covering the hollow body.

21. A blocking device according to claim 18, wherein the blocking member is free of an elastic mechanism for biasing the blocking member in an unblocking position.

22. A blocking device according to claim 18, wherein:
the reversible locking mechanism stably retains the control member in a position for unblocking the at least one strand.

23. A boot comprising:
a blocking device for blocking a lace tightening the boot on a foot of a wearer, said blocking device comprising:

a blocking member;
a hollow body having at least one cavity defining at least one pathway for the passage of each strand of said at least one strand;
a housing for the blocking member;
a control member connected to the blocking member for controlling movement of the blocking member in respective directions for blocking or unblocking the at least one strand;
the device functioning by cooperation of the blocking member with each of the at least one pathway for the blocking of each strand through a wedging effect;
a reversible locking mechanism stably retaining the control member in a position for unblocking the at least one strand; and
an outer surface of the blocking member being free of engagement with an elastic biasing mechanism in an unblocking position.

24. A boot according to claim 23, wherein the blocking member is free of an elastic mechanism for biasing the blocking member in a blocking position.

25. A boot according to claim 23, wherein:
the blocking member is guided for movement along a straight line along a length of the hollow body between a strand-blocking position and a strand-unblocking position; and
the control member is guided for movement between the strand-blocking and strand-unblocking positions along a path, at least a segment of said path being neither along said straight line nor parallel to said straight line.

26. A lace tightening mechanism comprising:
a blocking device for blocking movement of a lace, said blocking device comprising:
a blocking member;
a hollow body having at least one cavity defining at least one pathway for the passage of each strand of said at least one strand;
a housing for the blocking member;
a control member connected to the blocking member for controlling movement of the blocking member in respective directions for blocking or unblocking the at least one strand;
the device functioning by cooperation of the blocking member with each of the at least one pathway for the blocking of each strand through a wedging effect;
a reversible locking mechanism stably retaining the control member in a position for unblocking the at least one strand; and
an outer surface of the blocking member being free of engagement with an elastic biasing mechanism in an unblocking position.

27. A lace tightening mechanism according to claim 26, wherein the blocking member is free of an elastic mechanism for biasing the blocking member in a blocking position.

28. A lace tightening mechanism according to claim 26, wherein:
the blocking member is guided for movement along a straight line along a length of the hollow body between a strand-blocking position and a strand-unblocking position; and
the control member is guided for movement between the strand-blocking and strand-unblocking positions along a path, at least a segment of said path being neither along said straight line nor parallel to said straight line.

29. A blocking device adapted to act on two strands, said blocking device comprising:
one blocking member;
a hollow body including a first pathway for the passage of a first of the two strands and a second pathway for passage of a second of the two strands;
a housing for the blocking member;
the device functioning by cooperation of the one blocking member with both of the first and second pathways for the blocking of both of the first and second strands through a wedging effect, a control member being associated with the blocking member and allowing the one blocking member to be biased for a displacement in a direction for blocking or unblocking the first and second strands;
a reversible locking mechanism stably retaining the control member in a position for unblocking the first and second strands.

* * * * *